(12) United States Patent
Koshida

(10) Patent No.: US 8,344,566 B2
(45) Date of Patent: Jan. 1, 2013

(54) CONTROL DEVICE ARRANGEMENT FOR HYBRID VEHICLE ELECTRIC MOTORS

(75) Inventor: Takafumi Koshida, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 197 days.

(21) Appl. No.: 12/382,332

(22) Filed: Mar. 13, 2009

(65) Prior Publication Data

US 2009/0251018 A1 Oct. 8, 2009

(30) Foreign Application Priority Data

Apr. 7, 2008 (JP) ................. 2008-099379

(51) Int. Cl.
*H02K 5/10* (2006.01)
*H02K 5/00* (2006.01)
*H02K 7/10* (2006.01)

(52) U.S. Cl. .......................... 310/89; 310/85

(58) Field of Classification Search ............... 310/75 R, 310/85, 88, 89, 71, 112; 180/65; *H02K 7/10, H02K 5/00, 5/10*
See application file for complete search history.

(56) References Cited

U.S. PATENT DOCUMENTS

| | | | | |
|---|---|---|---|---|
| 5,491,370 | A * | 2/1996 | Schneider et al. | 310/54 |
| 5,770,902 | A * | 6/1998 | Batten et al. | 310/71 |
| 5,901,801 | A * | 5/1999 | Toida et al. | 310/71 |
| 6,081,056 | A * | 6/2000 | Takagi et al. | 310/89 |
| 6,166,498 | A * | 12/2000 | Yamaguchi et al. | 180/65.235 |
| 7,211,912 | B2 | 5/2007 | Takenaka et al. | |
| 7,222,685 | B2 * | 5/2007 | Takenaka et al. | 180/65.1 |
| 7,786,640 | B2 * | 8/2010 | Sada et al. | 310/112 |
| 2004/0226761 | A1 | 11/2004 | Takenaka et al. | |

FOREIGN PATENT DOCUMENTS

| | | |
|---|---|---|
| DE | 10 2004 013 578 A1 | 12/2004 |
| JP | A-54-28008 | 2/1979 |
| JP | A-9-182352 | 7/1997 |
| JP | A-2001-298908 | 10/2001 |
| JP | A-2004-148984 | 5/2004 |
| JP | A-2004-242472 | 8/2004 |
| JP | A-2004-343845 | 12/2004 |
| JP | 2007221962 A * | 8/2007 |
| JP | A-2007-221962 | 8/2007 |

OTHER PUBLICATIONS

Machine translation of JP2007-221962A.*
Mar. 27, 2012 Office Action issued in Chinese Patent Application No. 200980101206.0 (English Translation only).
Oct. 27, 2011 Office Action issued in Japanese Patent Application No. 2008-099379 (English Translation).
Feb. 14, 2012 Office Action issued in German Patent Application No. 11 2009 000 057.6 (English Translation only).

* cited by examiner

*Primary Examiner* — Quyen Leung
*Assistant Examiner* — Michael Andrews
(74) *Attorney, Agent, or Firm* — Oliff & Berridge, PLC

(57) ABSTRACT

A drive device includes a rotating electrical machine; a control device that controls the rotating electrical machine; and a case that accommodates the rotating electrical machine and the control device. The case includes a machine chamber that accommodates the rotating electrical machine, and an electric chamber that accommodates the control device. The machine chamber and the electric chamber are separated from each other by a partition wall, and a connection member that electrically connects the rotating electrical machine and the control device to each other is provided so as to extend through the partition wall in a fluid-tight state. Each of the machine chamber and the electric chamber has an opening on one axial end side of the rotating electrical machine, and a cover that covers the openings in a separated state from each other is mounted to the openings.

17 Claims, 4 Drawing Sheets

CONTROL DEVICE ARRANGEMENT FOR HYBRID VEHICLE ELECTRIC MOTORS

CROSS-REFERENCE TO RELATED APPLICATION

The disclosure of Japanese Patent Application No. 2008-099379 filed on Apr. 7, 2008, including the specification, drawings and abstract is incorporated herein by reference in its entirety.

BACKGROUND

The present invention generally relates to a drive device.

A drive device including a rotating electrical machine such as a motor and a generator, a control device for controlling the rotating electrical machine, and a case accommodating the rotating electrical machine and the control device has been already applied to various vehicles such as a hybrid vehicle and an electric motor vehicle. Regarding such a vehicle drive device, the following Japanese Patent Application Publication No. JP-A-2007-221962 (Page 7 to Page 9, FIGS. 3 to 6), for example, discloses a structure of a drive device as described below. This drive device includes a drive device case integrally accommodating a rotating electrical machine, a speed change mechanism, and a differential mechanism, and a control device case mounted on top of the drive device case and accommodating a control device such as an inverter for controlling the rotating electrical machine.

Communicating holes for allowing the drive device case and the control device case to communicate with each other are formed in the drive device case and the control device case. Bar-shaped connection terminals for electrically connecting the rotating electrical machine and the control device to each other are vertically inserted and placed in the communication holes. Upper ends of the connection terminals are electrically connected to terminals of the control device through bus bars, and lower ends of the connection terminal are electrically connected to coils of the rotating electrical machine through the bus bars. The communication holes and the connection terminals are sealed by an O-ring or the like in order to prevent lubricating and cooling oil and the like which are present within the drive device case from entering the control device case. Oil adhesion to the control device is thus prevented, whereby an insulating property is ensured.

SUMMARY

In such a drive device as described above, a drive device case accommodating a rotating electrical machine and the like and a control device case accommodating a control device are separately provided. Entry of oil from the drive device case into the control device case can therefore be easily prevented by merely sealing the periphery of connection terminals disposed so as to extend through the two cases. In such a structure, however, the control device case mounted on the drive device case and the control device are disposed so as to protrude significantly upward from the drive device case. This structure therefore increases the size of the drive device, and thus degrades its mountability on a vehicle.

In view of this problem, it is possible to integrally accommodate a rotating electrical machine and the like and a control device in one case to reduce the size of a drive device. However, by merely accommodating these components in one case, the control device cannot be disposed in a space sealed so that the control device does not contact a liquid such as oil and water. It is therefore difficult to ensure an insulating property of the control device and a connection member that electrically connects the control device with the rotating electrical machine.

The present invention is made in view of the above problems and it is an object of the present invention to provide a drive device implementing a reduction in size of a drive device by accommodating a rotating electrical machine and a control device for controlling the rotating electrical machine in one case, assuring sealing performance of a space in which the control device is accommodated, and improving manufacturing workability. The present invention can also achieve various other advantages.

A drive device according to an exemplary aspect of the invention includes a rotating electrical machine; a control device that controls the rotating electrical machine; and a case that accommodates the rotating electrical machine and the control device. The case includes a machine chamber that accommodates the rotating electrical machine, and an electric chamber that accommodates the control device. The machine chamber and the electric chamber are separated from each other by a partition wall, and a connection member that electrically connects the rotating electrical machine and the control device to each other is provided so as to extend through the partition wall in a fluid-tight state. Each of the machine chamber and the electric chamber has an opening on one axial end side of the rotating electrical machine, and a cover that covers the openings in a separated state from each other is mounted to the openings.

BRIEF DESCRIPTION OF THE DRAWINGS

Various exemplary aspects will be described with reference to the drawings, wherein.

DETAILED DESCRIPTION OF EMBODIMENTS

Figure 1:
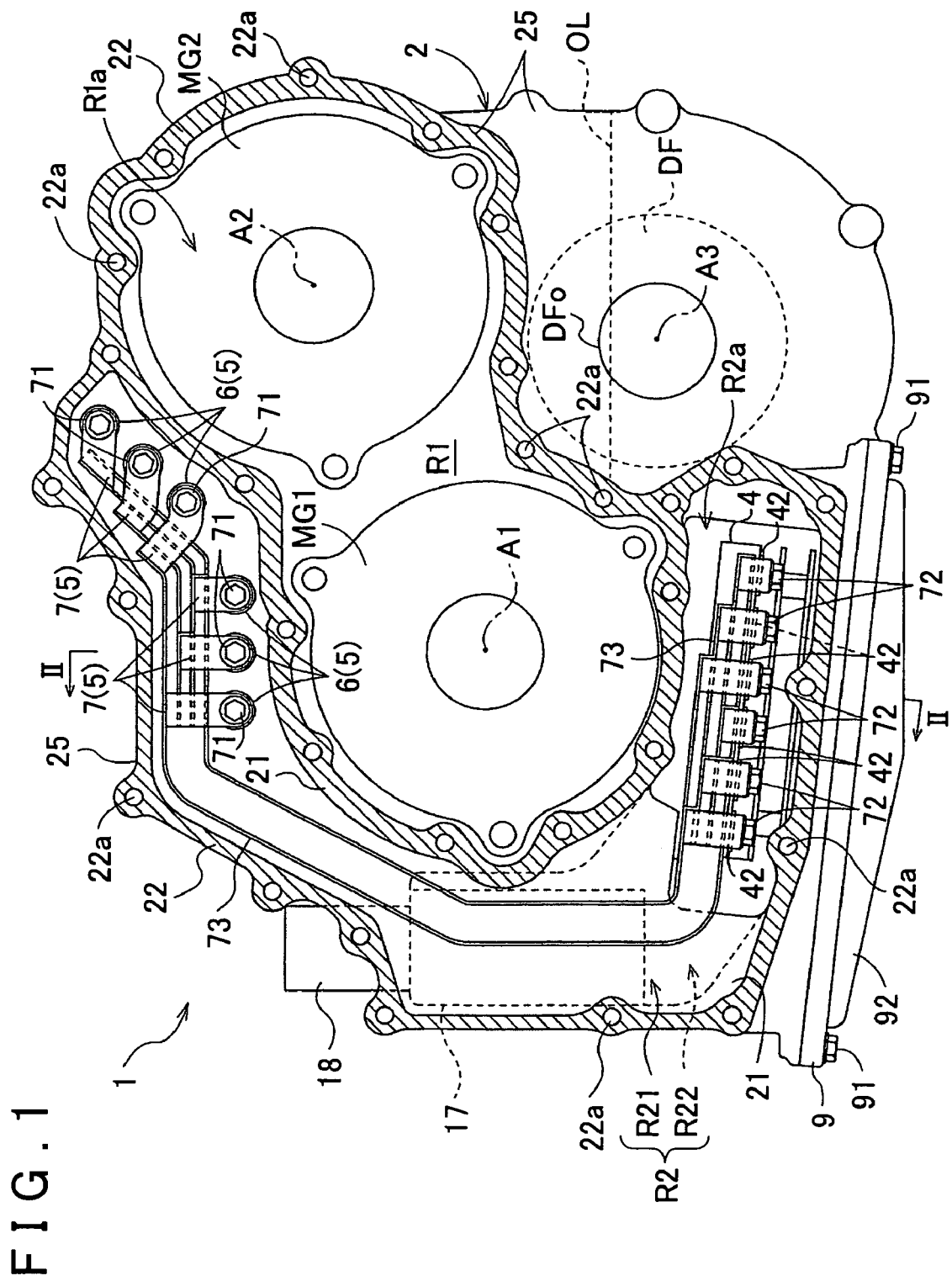
FIG. 1 is a front view of a drive device according to an embodiment of the present invention with a cover removed.

Hereinafter, an embodiment of the present invention will be described with reference to the accompanying drawings. Description will be given to an example in which the present invention is applied to a drive device 1 for a hybrid vehicle. As shown in FIGS. 1 though 5, the drive device 1 of the present embodiment is structured so that two rotating electrical machines, that is, a first rotating electrical machine MG1 and a second rotating electrical machine MG2, and a differential device DF are accommodated in one case 2. In this drive device 1, a control device 4 for controlling the two rotating electrical machines MG1, MG2, bus bars 7 for electrically connecting the control device 2 and the two rotating electrical machines MG1, MG2 to each other, and the like are also accommodated in the same case 2. The case 2 has a machine chamber R1 accommodating the rotating electrical machines MG1, MG2 and the like and an electric chamber R2 accommodating the control device 4 and the like. The chambers R1, R2 are separated from each other by a partition wall 21. Hereinafter, the structure of each part of the drive device of the present embodiment will be described in detail.

1. Structure of a Mechanism Part of the Drive Device

First, the structure of a mechanism part of the drive device 1 of the present embodiment will be schematically described. As shown in FIG. 1, the drive device 1 includes two rotating electrical machines, that is, the first rotating electrical machine MG1 and the second rotating electrical machine MG2, and the differential device DF. Note that FIG. 1 shows only the outer shapes of these components, and detailed shapes thereof are omitted. The first rotating electrical machine MG1, the second rotating electrical machine MG2, and the differential device DF are arranged radially adjacent to each other so that the lines connecting their axes form a triangle. The axis of the first rotating electrical machine MG1 (i.e., a rotation shaft of a rotor of the first rotating electrical machine MG1) is herein referred to as a first axis A1, the axis of the second rotating electrical machine MG2 (i.e., a rotation shaft of a rotor of the second rotating electrical machine MG2) is referred to as a second axis A2, and the axis of the differential device DF (an output shaft of the differential device DF) is referred to as a third axis A3. The first axis A1, the second axis A2, and the third axis A3 are arranged in parallel with each other. Arrangement of these axes with respect to the first axis A1 is as follows: as shown in FIG. 1, in the vertical direction, the second axis A2 is located above the first axis A1 and the third axis A3 is located below the first axis A1. In the horizontal direction, the second axis A2 and the third axis A3 are located on one side of the first axis A1 (on the right side in FIG. 1) and the second axis A2 is located slightly on one side of the third axis A3 (on the right side in FIG. 1). The first rotating mechanical machine MG1 and the second rotating electrical machine MG2 are positioned so as to overlap each other in the axial direction of the first axis A1 (the direction perpendicular to the plane of the paper of FIG. 1). In other words, the first rotating electrical machine MG1 and the second rotating electrical machine MG2 are positioned so as to overlap each other when viewed from the side (when viewed from the direction shown in FIG. 2). This structure reduces the overall axial length of the drive device 1. The first rotating electrical machine MG1, the second rotating electrical machine MG2, and the differential device DF are accommodated in the machine chamber R1 of the case 2.

Figure 2:
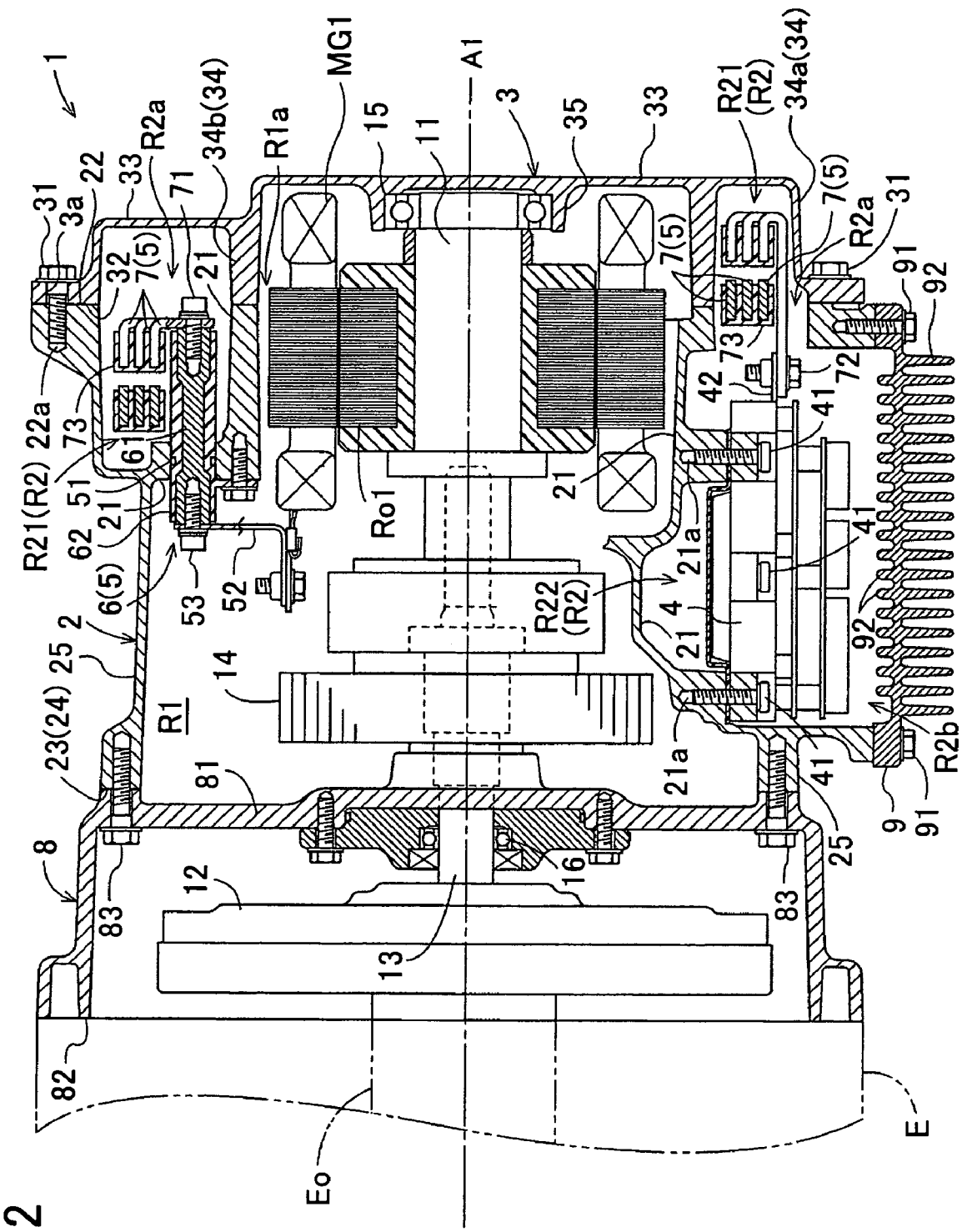
FIG. 2 is a cross-sectional view taken along line II-II in FIG. 1, showing the drive device with the cover attached thereto.

FIG. 2 shows a cross section of the drive device 1 along the first axis A1. As shown in FIG. 2, a rotation shaft 11 of the first rotating electrical machine MG1 and its rotor Ro1, an input shaft 13 connected to an output shaft Eo of an engine E through a damper 12, and a gear mechanism 14 for transmitting rotation of the first rotating electrical machine MG1 and the input shaft 13 to the differential device DF side are disposed on the first axis A1. Note that FIG. 2 shows only the outer shapes of the rotation shaft 11 of the rotor Ro1, the gear mechanism 14, the input shaft 13, and the damper 12 and detailed shapes thereof are omitted. On the first axis A1, the first rotating electrical machine MG1 is located at one axial end (on the cover 3 side; on the right side in FIG. 2). The rotation shaft 11 of the rotor Ro1 of the first rotating electrical machine MG1 is axially supported by a bearing 15 fixed to the cover 3. On the first axis A1, the gear mechanism 14 and the input shaft 13 are sequentially located from the first rotating electrical machine MG1 toward the other axial end (toward the left side in FIG. 2). The input shaft 13 is connected to the output shaft Eo of the engine E through the damper 12. The damper 12 is accommodated in a damper case 8 mounted to an end face 23 of the other axial end of the case 2. The input shaft 13 is axially supported by a bearing 16 fixed to a partition wall 81 of the damper case 8. The gear mechanism 14 is structured so that rotation of the first rotating electrical machine MG1 and the input shaft 13 can be transmitted to the differential device DF side. Description of a specific structure of the gear mechanism 14 will be omitted.

Figure 5:
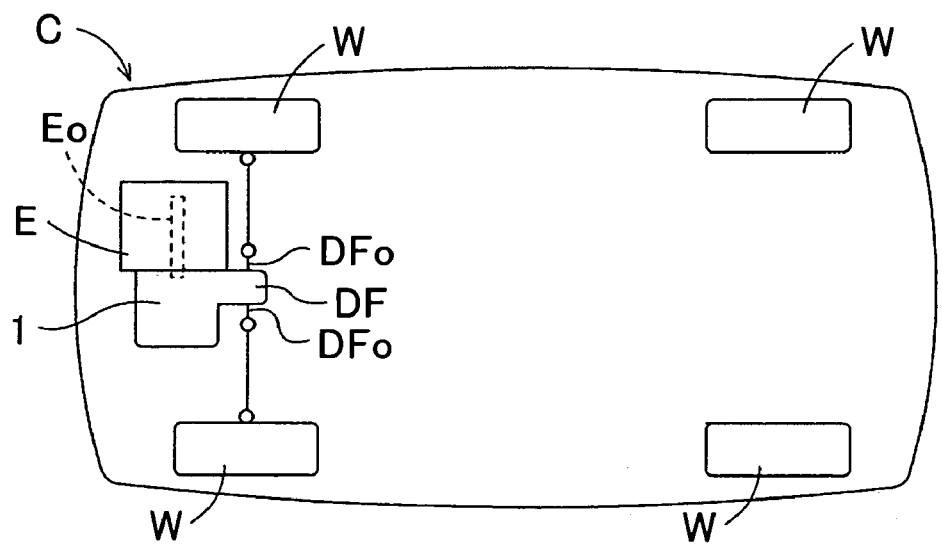
FIG. 5 is a diagram schematically showing an arrangement of the drive device in a vehicle.

The damper case 8 abuts on the end face 23 of the other axial end of the case 2 at its one axial end, and is mounted to a case of the engine E at an end face 82 of the other axial end of the damper case 8. In other words, the case 2 is connected to the engine E through the damper case 8 at the other axial end of the case 2. The end face 23 of the other axial end of the case 2 therefore corresponds to a connection portion 24 connected to the engine E. In the present embodiment, as shown in FIG. 5, the connection portion 24 is connected in the axial direction of the output shaft Eo of the engine E transversely mounted in a vehicle C. The damper case 8 is fixedly fastened to the case 2 by bolts 83. As shown in FIG. 5, output shafts DFo of the differential device DF are drivingly connected to wheels W. Accordingly, rotation of the first rotating electrical machine MG1 and the second rotating electrical machine MG2 is output through the differential device DF to the outside of the case 2 as rotation of the output shafts DFo of the differential device DF and transmitted to the wheels W. In the present embodiment, the differential device DF therefore corresponds to an output mechanism in the present invention. The first rotating electrical machine MG1 corresponds to a rotating electrical machine in the present invention.

2. Structure of the Case and the Cover

As shown in FIGS. 1 and 2, the case 2 has the machine chamber R1 accommodating the rotating electrical machines MG1, MG2 and the like, and the electric chamber R2 accommodating the control device 4 and the like. In the present embodiment, the machine chamber R1 accommodates the first rotating electrical machine MG1, the second rotating electrical machine MG2, the differential device DF, and the gear mechanism 14, as described above. The electric chamber R2 accommodates the control device 4 and the bus bars 7 that form a part of connection members 5. The machine chamber R1 and the electric chamber R2 are separated from each other by the partition wall 21. The partition wall 21 separates the machine chamber R1 and the electric chamber R2 from each other in a radial direction of the first rotating electrical machine MG1. The electric chamber R2 is located outside the machine chamber R1 in the radial direction of the first rotating electrical machine MG1.

An outer peripheral wall 25 that structures an outer shape of the case 2 is formed in a deformed cylindrical shape having an axis substantially in parallel with the respective axes (the first axis A1, the second axis A2, and the third axis A3) of the first rotating electrical machine MG1, the second rotating electrical machine MG2, and the differential device DF. The partition wall 21 is provided in a partial region of the case 2 in the axial direction of the first rotating electrical machine MG1. The partition wall 21 is provided radially inside the outer peripheral wall 25 so as to extend substantially in parallel with the outer peripheral wall 25. In other words, the case 2 has double peripheral walls, that is, the outer peripheral wall 25 and the partition wall 21 provided radially inside the outer peripheral wall 25, in the partial axial region of the case 2. As shown in FIG. 2, the partition wall 21 is located inside in the radial direction of the first rotating electrical machine MG1 with respect to the outer peripheral wall 25 in an axial region with no partition wall 21. In a wall portion extending in the radial direction of the first rotating electrical machine MG1, which corresponds to a stepped portion between the partition wall 21 and the outer peripheral wall 25, the partition wall 21 separates the machine chamber R1 and the electric chamber R2 from each other in the axial direction of the first rotating electrical machine MG1 (the direction along the first axis A1). In other words, in this example, the partition wall 21 separates the machine chamber R1 and the electric chamber R2 from each other in both radial and axial directions of the first rotating electrical machine MG1.

The machine chamber R1 has an axis substantially in parallel with the respective axes (the first axis A1, the second axis A2, and the third axis A3) of the first rotating electrical machine MG1, the second rotating electrical machine MG2, the differential device DF, the gear mechanism 14, and the like. The machine chamber R1 is formed in a deformed cylindrical shape surrounding the outer shapes of these components. The electric chamber R2 is formed so as to surround a part of the radial outside of the machine chamber R1. The machine chamber R1 and the electric chamber R2 have openings R1a, R2a at one axial end of the first rotating electrical machine MG1, respectively. In the present embodiment, the opening R1a of the machine chamber R1 and the opening R2a of the electric chamber R2 have a common opening end face 22 located on the same plane. As shown in FIG. 1, this opening end face 22 has a circumferential shape surrounding the opening R1a of the machine chamber R1 and the opening R2a of the electric chamber R2. As described later, the cover 3 is mounted so as to abut on the opening end face 22. A plurality of bolt holes 22a are formed in the opening end face 22 as a fastening portion for mounting the cover 3. The cover 3 is fixed to the opening end face 22 by fastening bolts 31 provided as a fastening member and inserted into bolt insertion holes 3a of the cover 3.

Figure 3:
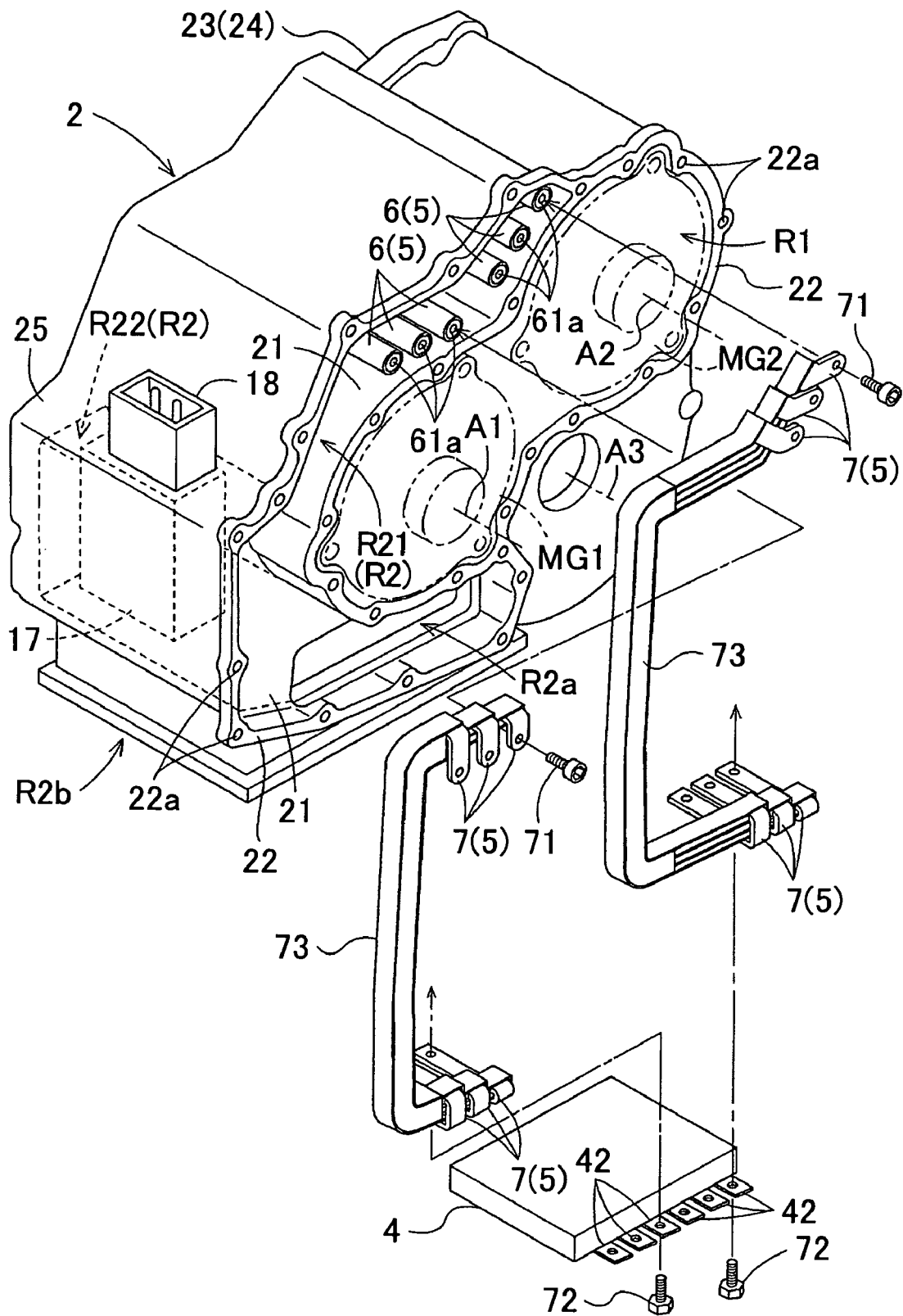
FIG. 3 is a diagram schematically showing an arrangement of an inner structure of the drive device.

As shown in FIGS. 1 through 3, the electric chamber R2 is divided into a first electric chamber R21 and a second electric chamber R22. The first electric chamber R21 faces the opening R2a and is formed along the circumferential direction of the first electrical machine MG1. The second electric chamber R22 is provided on the other axial end side of the first rotating electrical machine MG1 with respect to the first electric chamber R21, and is formed under the first rotating electrical machine MG1 and on the side of the first rotating electrical machine MG1 opposite to the side adjacent to the differential device DF. In a planar shape of the first electric chamber R21, the first electric chamber R21 extends along the circumferential direction of the first rotating electrical machine MG1 from an upper position (an upper left position in FIG. 1) of the second rotating electrical machine MG2 located on the first rotating electrical machine MG1 side to a lower position of the first rotating electrical machine MG1. The first electric chamber R21 is thus formed so as to have a strip shape extending in a substantially C-shape when viewed from the opening R2a side (the side of FIG. 1). The first electric chamber R21 is provided along the outer periphery of the first rotating electrical machine MG1 so as to extend down to a lateral side (the left lateral side in FIG. 1) of the first rotating electrical machine MG1 opposite to the side adjacent to the differential device DF. The first electric chamber R21 is opened toward one axial end of the first rotating electrical machine MG1. This opening is the opening R2a of the electric chamber R2. The first electric chamber R21 has a predetermined depth in the axial direction of the first rotating electrical machine MG1. The first electric chamber R21 accommodates mainly the bus bars 7 as described later.

As shown in FIGS. 1 and 3, the second electric chamber R22 has a substantially L-shaped planar shape when viewed from the opening R2a side. In other words, the second electric chamber R22 is located on lateral and lower sides of the first rotating electrical machine MG1 opposite to the side adjacent to the differential device DF. The second electric chamber R22 is provided on the other axial end side of the first rotating electrical machine MG1 with respect to the first electric chamber R21. The second electric chamber R22 is deeper than the first electric chamber R21 in the axial direction of the first rotating electrical machine MG1. The second electric chamber R22 accommodates mainly the control device 4 and a capacitor 17. More specifically, as shown in FIGS. 2 and 3, the control device 4 is accommodated under the first rotating electrical machine MG1 in the second electric chamber R22. The control device 4 is thus positioned under the first rotating electrical machine MG1 so as to overlap the differential device DF in the vertical direction. The second electric chamber R22 accommodates the capacitor 17 at a position lateral to the first rotating electrical machine MG1 (on the lateral side of the first rotating electrical machine MG1 opposite to the side adjacent to the differential device DF). As shown in FIGS. 1 and 3, a connector 18 is disposed above the capacitor 17. The connector 18 extends through the outer peripheral wall 25 of the case 2 and serves as a connection terminal for electrically connecting the inside of the electric chamber R2 to the outside of the case 2.

As shown in FIG. 2, the cover 3 is mounted to the opening R1a of the machine chamber R1 and the opening R2a of the electric chamber R2. The cover 3 covers the openings R1a, R2a in a separated state from each other. As described above, in the present embodiment, the opening R1a of the machine chamber R1 and the opening R2a of the electric chamber R2 have the common opening end face 22 located on the same plane. The two openings R1a, R2a are covered by the common cover 3 mounted so as to abut on the opening end face 22. In the present embodiment, the cover 3 has a cover surface 33 and a peripheral wall portion 34. The cover surface 33 is formed substantially in parallel with the opening end face 22 and covers the opening end face 22. The peripheral wall portion 34 is formed so as to protrude from the cover surface 33 toward the other axial end of the first rotating electrical machine MG1. An end face of the peripheral wall portion 34 located on the other axial end side is an abutting surface 32 that abuts on the opening end face 22 of the case 2. This abutting surface 32 has an approximately the same planar shape as that of the opening end face 22 of the case 2 on which the abutting surface 32 abuts. In other words, like the opening end face 22 of the case 2 shown in FIG. 1, the abutting surface 32 of the cover 3 has a circumferential shape surrounding the opening R1a of the machine chamber R1 and the opening R2a of the electric chamber R2. The peripheral wall portion 34 therefore has approximately the same layout shape as the shapes of the outer peripheral wall 25 and the partition wall 21 of the case 2 so as to conform to the shape of the opening end 22 of the case 2. In other words, the peripheral wall portion 34 of the cover 3 has an outer peripheral wall 34a and a partition wall 34b. The outer peripheral wall 34a extends continuously with the outer peripheral wall 25 of the case 2 in the axial direction of the first rotating electrical machine MG1. The partition wall 34b extends continuously with the partition wall 21 of the case 2 in the axial direction of the first rotating electrical machine MG1. In the state in which the abutting surface 32 of the peripheral wall portion 34 abuts on the opening end face 22 of the case 2, the opening R1a of the machine chamber R1 and the opening R2a of the electric chamber R2 are separated from each other by the peripheral wall portion 34 and the cover surface 33 of the cover 3. In other words, the cover 3 separates, together with the outer peripheral wall 25 and the partition wall 21 of the case 2, the space in the case 2 to form the machine chamber R1 and the electric chamber R2.

The cover surface 33 of the cover 3 has approximately the same planar shape as the outer shape of the opening end face 22 of the case 2 when viewed from one axial end side of the first rotating electrical machine MG1 (from the right side in FIG. 2). In other words, the contour of the planar shape of the cover 3 is approximately the same as the shape of the outer peripheral edge of the opening end face 22 surrounding the machine chamber R1 and the electric chamber R2 shown in FIG. 1. A boss portion 35 is provided at the intersection of the cover 3 and the first axis A1. The bearing 15 axially supporting the rotation shaft 11 of the rotor Ro1 of the first rotating electrical machine MG1 is fixed to the inner periphery of the boss portion 35. The cover 3 has a plurality of bolt insertion holes 3a as a fastened portion at positions corresponding to the bolt holes 22a of the opening end face 22. The cover 3 is fixed to the case 2 by inserting the bolts 31 as a fastening member into the bolt insertion holes 3a and fastening the bolts 31 in the bolt holes 22a. A liquid gasket, for example, is provided between the opening end face 22 of the case 2 and the abutting surface 32 of the cover 3 to form a sealed structure.

The electric chamber R2 of the case 2 has a second opening R2b that opens downward. The second opening R2b is formed in the outer peripheral wall 25 of the case 2. The second opening R2b is an opening formed in order to facilitate assembling of the control device 4 located under the first rotating electrical machine MG1 in the electric chamber R2 (the second electric chamber R22) to the case 2 and to facilitate maintenance and inspection, and the like. Accordingly, the planar shape of the second opening R2b is formed so as to be wider when viewed from under the case 2 than when viewed from under the control device 4. The control device 4 can thus be accommodated in the electric chamber R2 through the second opening R2b and fixed to the case 2. The control device 4 is fixed to the case 2 from beneath. More specifically, as shown in FIG. 2, a plurality of bolt holes 21a are formed as a fastening portion in the lower surface of the partition wall 21 of the case 2, and a plurality of bolt insertion holes (not shown) are formed as a fastened portion in the control device 4. By inserting bolts 41 as a fastening member into the bolt insertion holes of the control device 4 and fastening the bolts 41 in the bolt holes 21a, the control device 4 is fixed to the lower surface of the partition wall 21 in the case 2. The control device 4 to be located under the first rotating electrical machine MG1 can thus be easily assembled in the electric chamber R2, thereby improving manufacturing workability. Moreover, even with the drive device 1 being mounted on a vehicle, the control device 4 can be easily accessed from underneath the vehicle through the second opening R2b. Workability during, for example, maintenance and inspection of the control device 4 can be improved.

The second opening R2b is covered by a second cover 9. The second cover 9 is mounted to the outer peripheral wall 25 of the case 2 so as to entirely cover the second opening R2b. The second cover 9 is fixed to the case 2 by inserting bolts 91 through the second cover 9 and fastening the bolts 91 in bolt holes formed in the outer peripheral wall 25 of the case 2. The second cover 9 includes heat release fins 92. The heat release fins 92 serve to release the heat generated by the control device 4 to the outside.

3. Structure of the Connection Members

As shown in FIGS. 1 through 3, the connection members 5 are provided in the electric chamber R2 of the case 2 in addition to the control device 4 and the capacitor 17. In the present embodiment, the connection members 5 have connection terminals 6 and bus bars 7. The connection terminals 6 are provided in a portion extending through the partition wall 21. The bus bars 7 are provided in the electric chamber R2 as connection wirings for electrically connecting the control device 4 and the connection terminals 6 to each other. The connection terminals 6 function to provide electric connection between the machine chamber R1 and the electric chamber R2. The control terminals 6 extend through the partition wall 21 so that their respective one end sides are disposed in the electric chamber R2 (the first electric chamber R21) and their respective other end sides are disposed in the machine chamber R1. A plurality of connection terminals 6 are herein provided for each of the first rotating electrical machine MG1 and the second rotating electrical machine MG2. More specifically, a total of six connection terminals 6, three connected to the first rotating electrical machine MG1 and three connected to the second rotating electrical machine MG2, are provided as described later. The bus bars 7, on the other hand, function to provide electric connection between the connection terminals 6 and the control device 4. The bus bars 7 are entirely disposed in the electric chamber R2 and the most part of the bus bars 7 are disposed in the first electric chamber R21.

The connection terminals 6 extend through the partition wall 21 in a direction substantially in parallel with the axial direction of the first rotating electrical machine MG1. The connection terminals 6 are provided so as to overlap the machine chamber R1 in the axial direction of the first rotating electrical machine MG1. Accordingly, as shown in FIG. 2 and the enlarged view of the region around the connection terminals 6 in FIG. 4, the connection terminals 6 are provided so as to extend through a portion of the partition wall 21 which separates the machine chamber R1 and the electric chamber R2 from each other in the axial direction of the first rotating electrical machine MG1, that is, a wall portion of the partition wall 21 which extends in the radial direction of the first rotating electrical machine MG1. Each connection terminal 6 has a bar-shaped terminal main body 61 and an insulating member 62. The bar-shaped terminal main body 61 is formed by a conductive member, and the insulating member 62 is provided so as to cover the outer periphery of the terminal main body 61. The terminal main body 61 has a stepped columnar shape which is thick at its both ends and thin in the middle. A first bus-bar fixing portion 61a for fixing the bus bar 7 is provided on the electric chamber R2 side of the terminal main body 61. More specifically, the first bus-bar fixing portion 61a is provided at an end of the opening R2a side of the terminal main body 61 (on one axial end side of the first rotating electrical machine MG1; on the right side in FIGS. 2 and 4). The first bus-bar fixing portion 61a is herein structured so as to have a bolt hole and a seat surface. The bolt hole is provided as a fastening portion, and a bolt 71 as a fastening member for fixing the bus bar 7 is fastened in the bolt hole. The seat surface surrounds the bolt hole so that the bus bar 7 abuts on the seat surface. In the present embodiment, the first bus-bar fixing portion 61a corresponds to a wiring fixing portion of the present embodiment.

Figure 4:
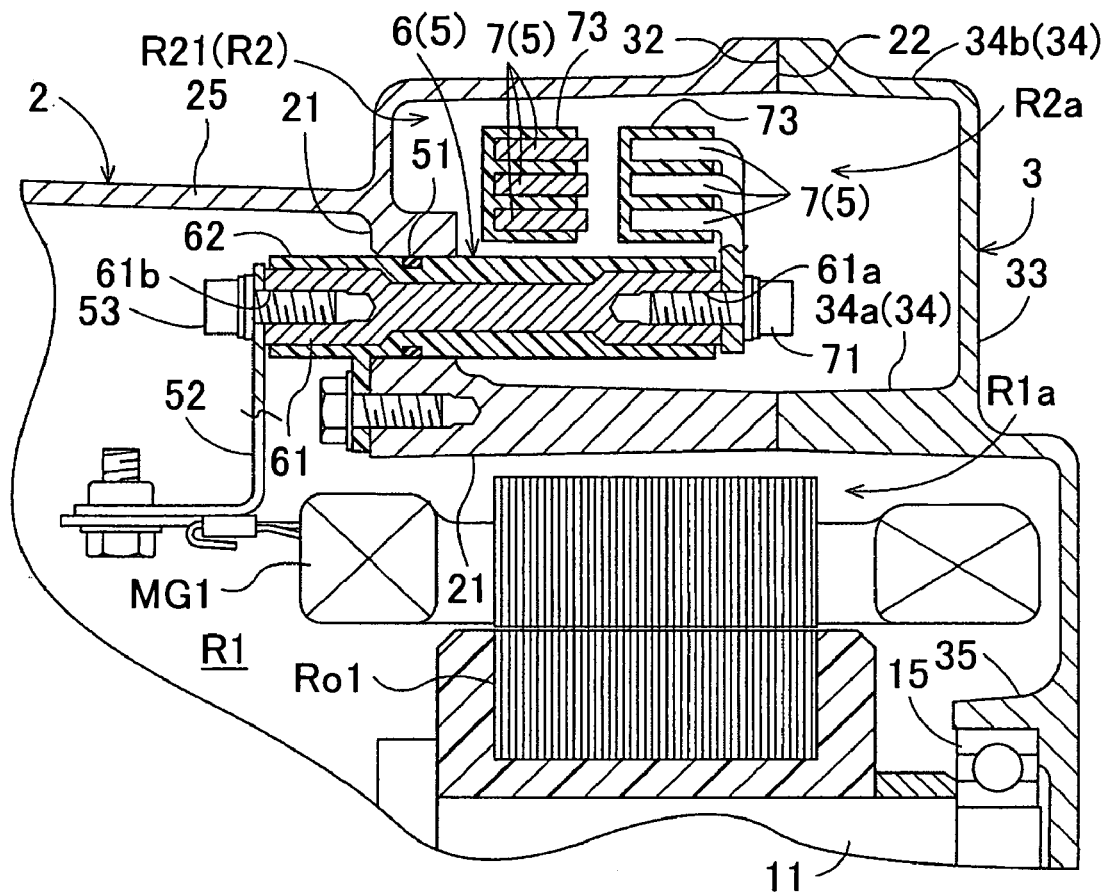
FIG. 4 is an enlarged view of a main part of FIG. 2.

A second bus-bar fixing portion 61b is provided on the machine chamber R1 side of each terminal main body 61. The second-bus bar fixing portion 61b fixes a bus bar 52 provided as a connection wiring for electrically connecting the connection terminal 6 with a coil of each phase of the first rotating electrical machine MG1 or the second rotating electrical machine MG2. More specifically, the second bus-bar fixing portion 61b is provided at the end of the terminal main body 61 located on the end face 23 side of the case 2, that is, on the other axial end side of the case 2 (on the other axial end side of the first rotating electrical machine MG1; on the left side in FIGS. 2 and 4). The second bus-bar fixing portion 61b is herein structured so as to have a bolt hole and a seat surface. The bolt hole is provided as a fastening portion, and a bolt 53 as a fastening member for fixing the bus bar 52 is fastened in the bolt hole. The seat surface surrounds the bolt hole so that the bus bar 52 abuts on the seat surface. Note that FIGS. 2 and 4 show only the bus bar 52 connecting the connection terminal 6 with a coil of the first rotating electrical machine MG1. However, the bus bars 52 connecting the connection terminals 6 with the second rotating electrical machine MG2 also have the same structure.

The insulating member 62 is provided at least in the outer periphery of the portion extending through the partition wall 21 in the terminal main body 61. The insulating member 62 is herein provided so as to entirely cover the outer periphery of the terminal main body 61. The insulating member 62 therefore has a cylindrical shape that is fitted onto the stepped columnar terminal main body 61. The insulating member 62 is made of a highly electrically insulating material. An O-ring 51 is disposed as a seal member between the insulating member 62 and the partition wall 21. More specifically, a circumferential groove is formed in a region of the outer peripheral surface of the insulating member 62, that is, a region in contact with the inner peripheral surface of the through-hole formation portion of the partition wall 21. The O-ring 51 is fitted along the groove. The O-ring 51 is elastically deformed between the outer peripheral surface of the insulating member 62 and the inner peripheral surface of the through-hole formation portion of the partition wall 21, whereby the connection terminal 6 (the insulating member 62) and the partition wall 21 are sealed in a fluid-tight state. The connection terminals 6 of the connection members 5 are thus provided so as to extend through the partition wall 21 in a fluid-tight state.

The control device 4 has six terminals 42 (see FIG. 1) respectively connected to three-phase coils, that is, U-phase, V-phase, and W-phase coils, of the first rotating electrical machine MG1 and the three-phase coils, that is, U-phase, V-phase, and W-phase coils, of the second rotating electrical machine MG2. Each terminal 42 of the control device 4 is respectively connected to the coil of each phase of each rotating electrical machine MG1, MG2 through each bus bar 7 and each connection terminal 6, and supplies alternating-current power to the corresponding rotating electrical machine MG1, MG2 or receives supply of the power generated by the corresponding rotating electrical machine MG1, MG2. In the present embodiment, as can be seen from FIGS. 1 and 3, the six terminals 42 of the control device 4 are arranged in line along the tangential direction to the outer periphery of the first rotating electrical machine MG1.

As shown in FIGS. 1 and 3, in the present embodiment, the six connection terminals 6 are similarly provided respectively corresponding to three phases, that is, U-phase, V-phase, and W-phase, of the first rotating electrical machine MG1 and three phases, that is, U-phase, V-phase, and W-phase, of the second rotating electrical machine MG2. The three connection terminals 6 corresponding to the respective phases of the first rotating electrical machine MG1 are arranged in line with each other in the tangential direction to the outer periphery of the first rotating electrical machine MG1 above the first rotating electrical machine MG1. The three connection terminals 6 corresponding to the respective phases of the second rotating electrical machine MG2 are arranged in line with each other in the tangential direction to the outer periphery of the second rotating electrical machine MG2 above the second rotating electrical machine MG2 on the first rotating electrical machine MG1 side (an upper left position in FIG. 1). In any case, these connection terminals 6 are provided at a position different from that of the control device 4 in the circumferential direction of the first rotating electrical machine MG1. More specifically, the control device 4 is provided under the first rotating electrical machine MG1 as described above. The six connection terminals 6, on the other hand, are provided above the first rotating electrical machine MG1. In this example, as shown in FIG. 1, an oil level OL is set so as to be located slightly above the third axis A3 which is the axis of the differential device DF and lower than the first axis A1 which is the axis of the first rotating electrical machine MG1. The connection terminals 6 are therefore located above the level OL of the oil stored in the machine chamber R1. This arrangement of the connection terminals 6 suppresses dipping of the connection terminals 6 in the oil in the machine chamber R1. As a result, the insulating property of the connection members, such as the connection terminals 6 and the bus bars 52 for electrically connecting the connection terminals 6 with the coils of the respective phases of the first rotating electrical machine MG1 or the second rotating electrical machine MG2, can be easily assured.

The bus bars 7 are provided along the outer periphery of the first rotating electrical machine MG1 so as to connect the control device 4 and the connection terminals 6 with each other. In other words, as described above, the control device 4 is provided under the first rotating electrical machine MG1 and the connection terminals 6 are provided above the first rotating electrical machine MG1. As shown in FIGS. 1 and 3, in the present embodiment, the bus bars 7 are provided along the circumferential direction of the first rotating electrical machine MG1 so as to have a substantially C shape when viewed from the opening R2*a* side (from the side of FIG. 1). The bus bars 7 thus extend along a lateral side of the first rotating electrical machine MG1 so as to connect the connection terminals 6 located above the first rotating electrical machine MG1 with the terminals 42 of the control device 4 located under the first rotating electrical machine MG1. The bus bars 7 are arranged so as to extend on the opposite lateral side of the first rotating electrical machine MG1 to the side adjacent to the differential device DF. The first electric chamber R21 of the case 2 described above is shaped so as to conform to the arrangement of the bus bars 7. Like the connection terminals 6, the bus bars 7 provided in the first electric chamber R21 are thus positioned so as to overlap the machine chamber R1 in the axial direction of the first rotating electrical machine MG1.

In the present embodiment, six bus bars 7 are provided in order to connect the six terminals 42 of the control device 4 with the six connection terminals 6, respectively. As specifically shown FIG. 2, the three bus bars 7 connected to the coils of the respective phases of the first rotating electrical machine MG1 and the three bus bars 7 connected to the coils of the respective phases of the second rotating electrical machine MG2 are arranged in a bundled state by bus-bar bundling members 73, respectively. Each bus-bar bundling member 73 is a member for arranging the corresponding three bus bars 7 at predetermined intervals and insulating the bus bars 7 from each other. The bus-bar bundling members 73 are therefore made of a highly insulating material. In the illustrated example, the three bus bars 7 connected to the first rotating electrical machine MG1 are located on one axial end side of the first rotating electrical machine MG1 (on the opening R2*a* side of the electric chamber R2; on the right side in FIG. 2) with respect to the three bus bars 7 connected to the second rotating electrical machine MG2. As shown in FIGS. 2 through 4, each bus bar 7 is folded in an L-shaped cross section at a position near the connection portion with the connection terminal 6. A part of each bus bar 7 which is substantially in parallel with the opening end face 22 of the case 2 is fixed to the first bus-bar fixing portion 61*a* of the respective connection terminal 6, and a part of each bus bar 7 which is substantially in parallel with the axial direction of the first rotating electrical machine MG1 is disposed along the outer periphery of the first rotating electrical machine MG1 in the first electric chamber R21. The bus bars 7 and the connection terminals 6 are fixedly fastened to each other by the bolts 71 and thus physically and electrically connected to each other. Each bus bar 7 is folded in a U-shaped cross section at a position near the connection portion with the terminal 42 of the control device 4. A part of each bus bar 7 which is located under the part disposed along the outer periphery of the first rotating electrical machine MG1 and which is substantially in parallel with the axial direction of the first rotating electrical machine MG1 extends into the second electric chamber R22 on the other axial end side of the first rotating electrical machine MG1 (on the connection portion 24 side; on the right side in FIG. 2). The tip portion of this part is fixed to the respective terminal 42 of the control device 4. The bus bars 7 and the terminals 42 of the control device 4 are fixedly fastened to each other by bolts 72 and thus physically and electrically connected to each other.

4. Other Embodiments (1) In the above embodiment, description was given to an example in which the opening R1a of the machine chamber R1 and the opening R2a of the electric chamber R2 have the common opening end face 22 located on the same plane and are covered by the common cover 3 mounted so as to abut on the opening end face 22. However, the embodiment of the present invention is not limited to this. For example, an opening end face of the opening R1a of the machine chamber R1 and an opening end face of the opening R2a of the electric chamber R2 may be located on different planes and may be covered by different covers from each other. This structure is also one of preferred embodiments of the present invention. In this structure, sealing between the opening end face of the case and the cover needs to be performed for each of the two openings. However, this structure is advantageous in that a high degree of design choice can be assured in terms of the layout shape of the machine chamber R1 and the electric chamber R2.

(2) In the above embodiment, description was given to an example in which the connection terminals 6 extend through the partition wall 21 in a direction substantially in parallel with the axial direction of the first rotating electrical machine MG1. However, the embodiment of the present invention is not limited to this. For example, the connection terminals 6 may be provided so as to extend through the partition wall 21 in the radial direction of the first rotating electrical machine MG1. This structure is also one of preferred embodiments of the present invention.

(3) In the above embodiment, description was given to an example in which the bus bars 7 are used as connection wirings, and the connection members 5 are structured to have the bus bars 7 and the connection terminals 6. However, the embodiment of the present invention is not limited to this. For example, it is also preferable to use cables as connection wirings. Moreover, it is also preferable to connect the rotating electrical machines MG1, MG2 and the control device 4 to each other by the cables without using the connection terminals 6. In this case as well, a seal member needs to be provided in a region where the cables extend through the partition wall 21 in order to assure a fluid-tight state.

(4) The positional relation between the machine chamber R1 and the electric chamber R2 described in the above embodiment was given by way of example only and other positional relations may be employed. For example, the control device 4 may be provided on a lateral side of the first rotating electrical machine MG1 or above the first rotating electrical machine MG1, and the bus bars 7 may be arranged so as to connect the control device 4 and the connection terminals 6 with each other. This structure is also one of preferred embodiments of the present invention. In this case, the drive device 1 becomes slightly larger in the lateral direction of the first rotating electrical machine MG1. However, the bus bars 7 and the first electric chamber R21 need not be arranged so as to extend down to a position under the first rotating electrical machine MG1. As a result, the length of the bus bars 7 and the size of the first electric chamber R21 can be reduced.

(5) In the above embodiment, description was given to an example in which the drive device 1 includes the differential device DF as an output mechanism in the case 2. However, the embodiment of the present invention is not limited to this. For example, the drive device may include a drive transmission mechanism other than the differential device DC, such as a gear mechanism, a transmission shaft, a transmission belt, and a chain, as an output mechanism. This structure is also one of preferred embodiments of the present invention.

(6) In the above embodiment, description was given to an example in which the drive device 1 has two rotating electrical machines, that is, the first rotating electrical machine MG1 and the second rotating electrical machine MG2. However, the embodiment of the present invention is not limited to this. For example, the drive device may have only one rotating electrical machine or three or more rotating electrical machines. This structure is also one of preferred embodiments of the present invention.

(7) In the above embodiment, description was given to an example in which the drive device 1 is a device for a hybrid vehicle which is connected to the engine E. However, the embodiment of the present invention is not limited to this. For example, the drive device may be a drive device for an electric motor vehicle or the like which includes only a rotating electrical machine as a power source of the vehicle. This is also one of preferred embodiments of the present invention.

The present invention is a drive device including a rotating electrical machine such as a motor and a generator, and is preferably applicable in a drive device that is preferably used in various vehicles such as a hybrid vehicle and an electric motor vehicle.

Note that, in the present application, the term rotating electrical machine conceptually includes a motor (electric motor), a generator (electric generator), and a motor-generator performing both functions of a motor and a generator according to need.

According to an exemplary aspect of the invention, the rotating electrical machine and the control device are respectively accommodated in the machine chamber and the electric chamber provided in the case. Since the rotating electrical machine and the control device can be integrally accommodated in one case, a reduction in the size of the drive device can be achieved. The machine chamber and the electric chamber are separated from each other by the partition wall, and the connection member is provided so as to extend through the partition wall in a fluid-tight state. Therefore, liquid such as oil that is present in the machine chamber can be prevented from entering the electric chamber while obtaining electric connection between the rotating electrical machine and the control device. Accordingly, sealing performance of the electric chamber can be assured. Moreover, both the machine chamber and the electric chamber have an opening on one axial end side of the rotating electrical machine. Members to be accommodated in the machine chamber and the electric chamber can therefore be assembled in the case from the same direction, whereby manufacturing workability can be improved. Moreover, the cover mounted to the two openings of the machine chamber and the electric chamber can separate the machine chamber and the electric chamber from each other and can cover the two openings. Accordingly, a structure which separates the machine chamber and the electric chamber from each other with a simple structure and assures sealing performance of the electric chamber while improving manufacturing workability can be implemented.

According to an exemplary aspect of the invention, the common cover can be used to cover the two openings of the machine chamber and the electric chamber, and the common opening end face located on the same plane can be used as an abutting surface between the cover and the case. This can simplify the sealing structure of the abutting surface, whereby sealing performance of the machine chamber and the electric chamber can be easily ensured.

According to an exemplary aspect of the invention, the electric chamber and the control device are provided radially outside the machine chamber accommodating the rotating electrical machine so as to be adjacent to the machine chamber. This can prevent an increase in the size of the drive device in the axial direction of the rotating electrical machine and can also minimize an increase in the size of the rotating electrical machine in the radial direction. The size of the drive device can therefore be reduced.

According to an exemplary aspect of the invention, the connection member for electrically connecting the rotating electrical machine and the control device to each other is provided so as to extend through the partition wall in a direction substantially in parallel with the axial direction of the rotating electrical machine. An increase in the size of the drive device in the radial direction of the rotating electrical machine due to the connection member can therefore be suppressed. Moreover, the connection member is positioned so as to overlap the machine chamber in the axial direction of the rotating electrical machine. This can also prevent an increase in the size of the drive device in the axial direction of the rotating electrical machine. The size of the drive device can therefore be reduced.

According to an exemplary aspect of the invention, the connection terminal is provided so as to extend through the partition wall, and fixing the connection wiring to the wiring fixing portion of the connection terminal can be easily performed by inserting tools or the like through the opening of the electric chamber. This improves manufacturing workability. Moreover, the size of the space for inserting the tools or the like can be reduced, enabling a reduction in the size of the drive device.

According to an exemplary aspect of the invention, the connection wiring is provided along the outer periphery of the rotating electrical machine. Therefore, even if the control device and the connection terminal are provided at different positions from each other in the circumferential direction of the rotating electrical machine, an increase in the size of the electric chamber in the radial and axial directions of the rotating electrical machine due to the connection wiring can be minimized. As a result, the size of the drive device can be reduced.

According to an exemplary aspect of the invention, the connection terminal extending through the partition wall can be prevented from being dipped in the oil in the machine chamber. As a result, the insulating property of the connection member such as the connection terminal and the connection wiring for electrically connecting the connection terminal and the rotating electrical machine to each other can be easily ensured.

According to an exemplary aspect of the invention, electric insulation between the connection terminal and the partition wall can be ensured, and fluid-tightness in the portion where the connection terminal extends through the partition wall can be ensured.

According to an exemplary aspect of the invention, in the case where the drive device includes the output mechanism located adjacent to the rotating electrical machine and the output mechanism has its output shaft located under the axis of the rotating electrical machine, the control device can be efficiently disposed by using the space produced by the difference in vertical position between the rotating electrical machine and the output mechanism. Accordingly, the size of the drive device can be reduced.

According to an exemplary aspect of the invention, the control device, which is to be located under the rotating electrical machine in the electric chamber, can be easily assembled in the case with the second cover being removed. As a result, workability in manufacturing of the drive device can be improved. Moreover, even with the drive device being mounted on a vehicle or the like, the control device can be easily accessed from the second opening by removing the second cover. Workability in maintenance, inspection, and the like of the control device can also be improved.

According to an exemplary aspect of the invention, although the drive device having this structure includes two rotating electrical machines, the two rotating electrical machines are positioned so as to axially overlap each other, whereby the overall axial length of the drive device is suppressed. By applying each structure of the present invention to the drive device having this arrangement of the rotating electrical machines, an increase in the size of the drive device in the axial and radial directions of the rotating electrical machines can be suppressed. As a result, the size of the drive device can further be reduced.

According to an exemplary aspect of the invention, the openings of the machine chamber and the electric chamber provided on one axial end side of the rotating electrical machine are located on the opposite side in the axial direction of the rotating electrical machine to the connection portion connected to the engine. Accordingly, even when the drive device is, for example, a drive device for a hybrid vehicle which is connected to the engine, workability in, for example, maintenance of the structural members accommodated in the case can be improved.

What is claimed is:

1. A drive device, comprising:
a rotating electrical machine;
a control device that controls the rotating electrical machine; and
a case that accommodates the rotating electrical machine and the control device, wherein:
the case includes a machine chamber that accommodates the rotating electrical machine, and an electric chamber that accommodates the control device,
the machine chamber and the electric chamber are separated from each other by a partition wall, and a connection member that electrically connects the rotating electrical machine and the control device to each other is provided so as to extend through the partition wall in a fluid-tight state,
the machine chamber has a machine chamber opening that is structured to allow the rotating electrical machine to pass through the machine chamber opening and the electric chamber has an electric chamber opening that is structured to allow the control device to pass through the electric chamber opening, the openings are both open in an axial direction on one axial end side of the rotating electrical machine, a cover that covers the openings in a separated state from each other is mounted to the openings, the machine chamber and the electric chamber are separated from each other in a radial direction of the rotating electrical machine.

2. The drive device according to claim 1, wherein:

the openings have a common opening end face located on a same plane, and the openings are covered by the cover that is common to the openings and is mounted so as to abut on the opening end face.

3. The drive device according to claim 2, wherein the connection member extends through the partition wall in a direction substantially parallel with the axial direction of the rotating electrical machine, and is positioned so as to overlap the machine chamber in the axial direction of the rotating electrical machine.

4. The drive device according to claim 2, wherein:

the connection member includes a connection terminal provided in a portion extending through the partition wall, and a connection wiring provided in the electric chamber that electrically connects the control device and the connection terminal to each other, and a wiring fixing portion that fixes the connection wiring is provided at an end of an opening side of the connection terminal.

5. The drive device according to claim 1, wherein the connection member extends through the partition wall in a direction substantially parallel with the axial direction of the rotating electrical machine, and is positioned so as to overlap the machine chamber in the axial direction of the rotating electrical machine.

6. The drive device according to claim 5, wherein:

the connection member includes a connection terminal provided in a portion extending through the partition wall, and a connection wiring provided in the electric chamber that electrically connects the control device and the connection terminal to each other, and a wiring fixing portion that fixes the connection wiring is provided at an end of the opening side of the connection terminal.

7. The drive device according to claim 1, wherein:

the connection member includes a connection terminal provided in a portion extending through the partition wall, and a connection wiring provided in the electric chamber that electrically connects the control device and the connection terminal to each other, and a wiring fixing portion that fixes the connection wiring is provided at an end of an opening side of the connection terminal.

8. The drive device according to claim 7, wherein:

the control device and the connection terminal are provided at different positions from each other in a circumferential direction of the rotating electrical machine, and the connection wiring extends along an outer periphery of the rotating electrical machine so as to connect the control device and the connection terminal to each other.

9. The drive device according to claim 7, wherein the connection terminal is located above an oil level in the machine chamber.

10. The drive device according to claim 7, wherein the connection terminal has an insulating member at least on an outer periphery of the portion extending through the partition wall, and a seal member is provided between the insulating member and the partition wall.

11. The drive device according to claim 1, further comprising:

an output mechanism that outputs a rotation of the rotating electrical machine outside of the case, wherein:

the output mechanism is located adjacent to the rotating electrical machine and has an output shaft located under an axis of the rotating electrical machine, and the control device is positioned under the rotating electrical machine so as to vertically overlap the output mechanism.

12. The drive device according to claim 11, wherein the electric chamber has a second opening which opens downward with the second opening covered by a second cover.

13. The drive device according to claim 1, wherein:

the rotating electrical machine is a first rotating electrical machine, the drive device further comprises a second rotating electrical machine provided in the machine chamber so as to be adjacent to the first rotating electrical machine, and the first rotating electrical machine and the second rotating electrical machine are positioned so as to axially overlap each other.

14. The drive device according to claim 1, wherein:

the case has a connection portion connected to an engine, and the connection portion is provided on another axial end side of the rotating electrical machine, and the connection portion is connected in an axial direction of the engine that is transversely mounted on a vehicle.

15. The drive device according to claim 1, wherein the connection member extends through the partition wall in a direction substantially parallel with the axial direction of the rotating electrical machine.

16. The drive device according to claim 1, wherein the connection member passes through a connection member opening that connects the machine chamber and the electric chamber.

17. The drive device according to claim 16, wherein the connection member opening is smaller than the machine chamber opening and the electric chamber opening.

* * * * *